United States Patent
Gao et al.

(10) Patent No.: US 11,974,333 B2
(45) Date of Patent: Apr. 30, 2024

(54) METHOD AND APPARATUS FOR CONFIGURING RANDOM ACCESS RESOURCE, AND BASE STATION

(71) Applicant: Beijing Unisoc Communications Technology Co., Ltd., Beijing (CN)

(72) Inventors: Xinghang Gao, Beijing (CN); Zhikun Xu, Beijing (CN)

(73) Assignee: Beijing Unisoc Communications Technology Co., Ltd., Beijing (CN)

( * ) Notice: Subject to any disclaimer, the term of this patent is extended or adjusted under 35 U.S.C. 154(b) by 371 days.

(21) Appl. No.: 17/600,088

(22) PCT Filed: Dec. 25, 2019

(86) PCT No.: PCT/CN2019/128140
§ 371 (c)(1),
(2) Date: Sep. 29, 2021

(87) PCT Pub. No.: WO2020/199679
PCT Pub. Date: Oct. 8, 2020

(65) Prior Publication Data
US 2022/0201766 A1    Jun. 23, 2022

(30) Foreign Application Priority Data
Mar. 29, 2019 (CN) .......................... 201910249197.5

(51) Int. Cl.
*H04W 74/0833* (2024.01)
*H04W 72/02* (2009.01)
(Continued)

(52) U.S. Cl.
CPC ....... *H04W 74/0841* (2013.01); *H04W 72/02* (2013.01); *H04W 72/0446* (2013.01);
(Continued)

(58) Field of Classification Search
CPC ............. H04W 74/0841; H04W 72/02; H04W 72/0446; H04W 72/0453; H04W 72/1263; H04W 74/0866
See application file for complete search history.

(56) References Cited

U.S. PATENT DOCUMENTS

2018/0124626 A1    5/2018  Tsai et al.
2022/0124820 A1*   4/2022  Ko ................... H04W 56/0045

FOREIGN PATENT DOCUMENTS

CN      108076534 A     5/2018
CN      108886814 A     11/2018
(Continued)

OTHER PUBLICATIONS

European Patent Office, Extended Search Report, European Application No. 19922384.3, 14 pages.
(Continued)

*Primary Examiner* — Mohammad S Anwar
(74) *Attorney, Agent, or Firm* — CHRISTENSEN O'CONNOR JOHNSON KINDNESS PLLC

(57) ABSTRACT

Provided is a method and apparatus for configuring random access resource and a base station. The method includes: configuring a physical uplink shared channel occasion (PO) resource pool required for data transmission and associated with preambles transmitted on all random access channel occasions (RO) in each same time domain or all ROs in each same random access channel (RACH) slot in each RACH period, the PO resource pool includes one or more data transmission resource POs; performing consecutive mapping between preambles on each RO and POs in the PO resource pool; and in response to remaining POs in the PO resource pool being insufficient to map all preambles transmitted on the ROs, configuring the remaining POs as invalid POs to which preambles are no longer mapped.

20 Claims, 12 Drawing Sheets

(51) Int. Cl.
- H04W 72/0446 (2023.01)
- H04W 72/0453 (2023.01)
- H04W 72/1263 (2023.01)
- H04W 74/08 (2024.01)

(52) U.S. Cl.
CPC ... *H04W 72/0453* (2013.01); *H04W 72/1263* (2013.01); *H04W 74/0866* (2013.01)

(56) References Cited

FOREIGN PATENT DOCUMENTS

| | | |
|---|---|---|
| CN | 109245876 A | 1/2019 |
| CN | 109451581 A | 3/2019 |
| JP | 2011-520366 A | 7/2011 |
| WO | 2018131891 A1 | 7/2018 |
| WO | 2018144873 A1 | 8/2018 |

OTHER PUBLICATIONS

Samsung, "Enhancements to Initial Access Procedures for NR-U," 3GPP TSG RAN WG1 Meeting #96, Athens, Greece, Feb. 25-Mar. 1, 2019, 10 pages.

MCC Support, Draft Report of 3GPP TSG RAN WG1 #93 v0.1.0, Busan, South Korea, May 21-25, 2008, 189 pages.

ZTE., "Summary of 7.2.1.1 Channel Structure for Two-step RACH." 3GPP TSG RAN WGJ #96, R1-1903435., Mar. 1, 2019 (Mar. 1, 2019), sections 1-3.

ZTE, Sanechips, "Considerations on the Channel Structure of MsgA." 3GPP TSG RAN WGJ Meeting #96, R1-1901626., Mar. 1, 2019 (Mar. 1, 2019), entire document.

Qualcomm Incorporated. "Channel Structure for Two-Step Rach." 3GPP TSG-RAN WGJ Meeting #96, R1-1902977., Mar. 1, 2019 (Mar. 1, 2019), entire document.

International Search Report and Written Opinion mailed Mar. 23, 2020, issued in corresponding International Application No. PCT/CN2019/128140, filed Dec. 25, 2019, 9 pages.

Chinese Office Action mailed Aug. 2, 2022, issued in related Chinese Application No. 201910249197.5 filed Mar. 29, 2019, 9 pages.

CATT, Discussion on Channel Structure for 2-Step RACH, 3GPP TSG RAN WG1 Meeting #96 Athens, Greece, 25th Feb.-Mar. 1, 2019, Agenda Item 7.2.1.

Decision to Grant Patent dated Oct. 28, 2022, issued in related Japanese Patent Application No. 2021-554390 filed Dec. 25, 2019, 5 pages.

* cited by examiner

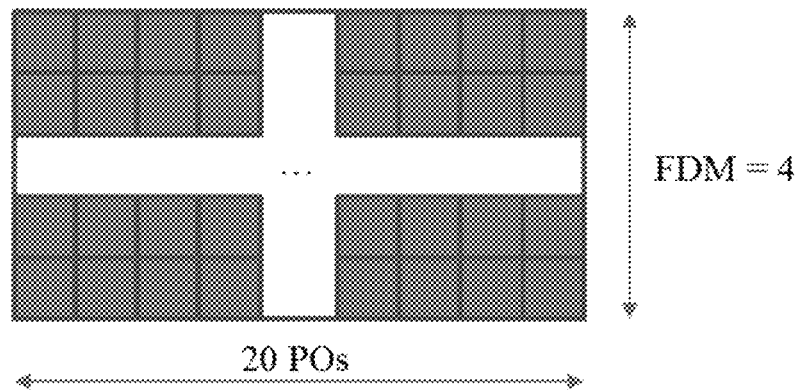
FIG. 8
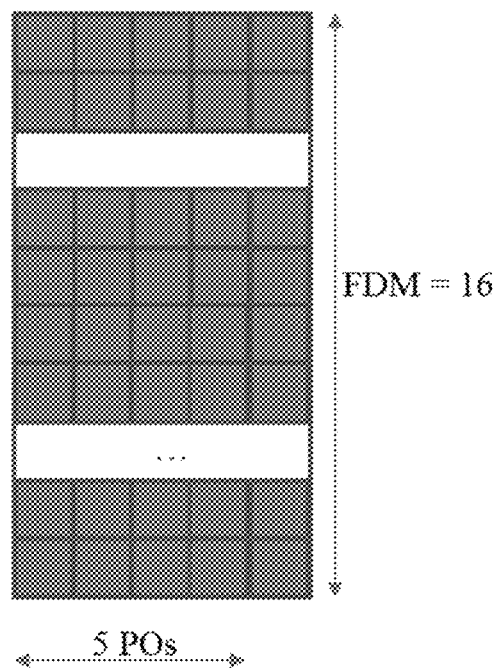
FIG. 9
| r1 | r3 | r5 | r7 | r9 | 1 |
|----|----|----|----|----|---|
|    |    |    |    |    | 1 |
| r0 | r2 | r4 | r6 | r8 | 1 |
|    |    |    |    |    | 0 |
FIG. 10

|   |   |   |   |   |   |   |
|---|---|---|---|---|---|---|
| 6 |   |   |   |   |   |   |
| 5 |   |   |   |   |   |   |
| 4 |   |   |   |   |   |   |
| 3 |   |   |   |   |   |   |
| 2 |   |   |   |   |   |   |
| 1 |   |   |   |   |   |   |
| 0 |   |   |   |   |   |   |

☐ A base station indicates that an UL is used as an SRS/a configured grant/a 4-step RACH RO

METHOD AND APPARATUS FOR CONFIGURING RANDOM ACCESS RESOURCE, AND BASE STATION

CROSS-REFERENCE TO RELATED APPLICATIONS

The present application is a National Phase of International Application No. PCT/CN2019/128140, filed on Dec. 25, 2019, which claims priority to Chinese Patent Application No. 201910249197.5, filed on Mar. 29, 2019, the contents of both of which are incorporated herein by reference in their entireties.

TECHNICAL FIELD

The present disclosure relates to the technical field of wireless communications and, in particular, to a method and apparatus for configuring random access resource and a base station.

BACKGROUND

New radio (NR) supports contention access of a 4-step random access channel (RACH) to complete initial access or obtain uplink synchronization.

In a general scenario, when the UE needs to transmit uplink data, the UE needs to request, from the base station, a time-frequency domain resource required for data transmission, and the base station allocates an uplink resource to the UE after receiving a request.

To reduce a data transmission delay of the UE, a pre-configured resource indication solution is introduced. The base station pre-configures and indicates a time-frequency domain resource set required for transmitting data of a specified length, including a start radio frame, a start subframe, a start symbol within a start slot, and a time domain occupation length that are of the resource set, a frequency domain resource, and a resource period, to form some periodic time-division multiplexing (TDM) distributed resources. When the UE needs to transmit data, the UE does not need to request the base station, and can transmit data on the pre-configured uplink resources, to reduce the data transmission delay.

The UE performing the 2-step RACH first determines a time-frequency resource (RO) for PRACH transmission based on strength of a received downlink signal, randomly selects a to-be-transmitted preamble in a pre-configured preamble pool, and transmits required data (a UE in an idle state/inactive state needs to transmit control data, and a UE in a connected state may transmit partial user data) on a configured/pre-configured physical uplink shared channel (PUSCH) time-frequency resource PUSCH occasion (PO). Therefore, the preamble needs to be associated with the time-frequency resources required for data transmission, to ensure that the UE can know, after selecting the preamble, the required data is transmitted on which resource. A time-frequency resource required for transmission of a single piece of data is defined as a PO. How to configure POs associated with preambles on each RO and how to determine mapping between the preambles and the POs are problems that need to be resolved.

When a resource required for data transmission in the 2-step RACH is configured based on a pre-configured resource indication method, only a TDM PO resource can be configured once in an existing configuration method. Mapping between the POs and the preambles needs to be performed, and data transmission delays on some POs will be quite large. If configuration is performed for a plurality of times to cover different frequency domain directions, network signaling overheads will be increased. In addition, if a PO resource pool is configured in a unit of an RO, all contention preambles on the RO need to be mapped to the POs. If there is a remaining PO to which not all preambles available to the 2-step RACH on the RO can be mapped, there will be remaining POs at a same position on all ROs in a same time domain. In this case, remaining POs in the PO resource pools associated with all ROs in a period form distributed resources, and resource utilization is reduced.

SUMMARY

A method and apparatus for configuring random access resource and a base station provided in the present disclosure can reduce network signaling overheads and improve resource utilization.

According to a first aspect, the present disclosure provides a method for configuring random access resource. The method is applied to a base station, and the method includes: configuring a physical uplink shared channel occasion (PO) resource pool required for data transmission and associated with preambles transmitted on all random access channel occasions (ROs) in each same time domain or all ROs in each same random access channel (RACH) slot in each RACH period, wherein the PO resource pool includes one or more data transmission resource POs; performing consecutive mapping between preambles on each RO and POs in the PO resource pool; and in response to remaining POs in the PO resource pool cannot map all preambles transmitted on the ROs, configuring the remaining POs as invalid POs to which preambles are no longer mapped.

In an embodiment, said configuring a PO resource pool required for data transmission and associated with preambles transmitted on all ROs in each same time domain or all ROs in each same RACH slot in each RACH period includes: configuring the PO resource pool in a unit of all the ROs in the same time domain, wherein a PO set associated with all the ROs in the same time domain is the PO resource pool, the PO in the PO resource pool is associated with the preamble transmitted on the RO, and a number of the PO resource pools is equal to a number of time domain ROs in the RACH period.

In an embodiment, said configuring a PO resource pool required for data transmission and associated with preambles transmitted on all ROs in each same time domain or all ROs in each same RACH slot in each RACH period includes: configuring the PO resource pool in a unit of all the ROs within the same RACH slot, wherein the PO in the PO resource pool is associated with the preamble transmitted on the RO, and a number of the PO resource pools is equal to a number of RACH slots in the RACH period.

In an embodiment, said configuring a PO resource pool required for data transmission and associated with preambles transmitted on all ROs in each same time domain or all ROs in each same RACH slot in each RACH period includes: configuring the PO resource pool in a unit of all the ROs within the same RACH slot, wherein the PO in the PO resource pool is associated with the preamble transmitted on the RO, and a number of the PO resource pools is equal to a number of RACH slots in the RACH period.

In an embodiment, said performing consecutive mapping between preambles on each RO and POs in the PO resource pool includes: performing mapping in one of the following manners based on a mapping relationship and a preamble index in a sequence of first all ROs in the same time domain and then all ROs in different time domains or first all ROs in a same frequency domain and then all ROs in different frequency domains: first mapping a PO at the first time domain PO position in the resource pool to a frequency domain end position of the resource pool in a frequency domain direction, and then performing mapping in the frequency domain direction at the second time domain PO position, until mapping between the preambles on all the ROs and the POs is completed; first mapping a PO at the first time domain PO position in the resource pool to a time domain end position of the resource pool in a time domain direction, and then performing mapping in the time domain direction at the second frequency domain PO position, until mapping between the preambles on all the ROs and the POs is completed; first mapping a PO at the first time domain PO position in the resource pool to a specified frequency domain position in a frequency domain direction, then mapping a PO associated with a preamble on the first RO at the second time domain PO position to the specified frequency domain position in the frequency domain direction, and then mapping a PO associated with a preamble on the second RO according to a same mapping principle in the frequency domain direction, until mapping between the preambles on all the ROs and the POs is completed; first mapping a PO at the first time domain PO position in the resource pool to a specified time domain position in a time domain direction, then mapping a PO associated with a preamble on the first RO at the second frequency domain PO position to the specified time domain position in the time domain direction, then mapping a PO associated with a preamble on the second RO according to a same mapping principle in the time domain direction, and then performing mapping in a frequency domain direction after completing mapping in the time domain direction, until mapping between the preambles on all the ROs and the POs is completed; or mapping POs associated with a same preamble on different ROs in the resource pool first in a time domain and then in a frequency domain or first in a frequency domain and then in a time domain, and sequentially performing mapping based on the preamble index, until mapping between the preambles on all the ROs and the POs is completed.

In an embodiment, the method may further include: in response to an indicated PO resource conflicting with an uplink resource configured by the base station as a downlink resource or another function, configuring the corresponding PO as an invalid PO, and skipping mapping between the invalid PO and the preamble transmitted on the RO in the resource pool; or performing rate matching or a puncture operation on data transmitted on the corresponding PO.

In an embodiment, said configuring the corresponding PO as an invalid PO, and skipping mapping between the invalid PO and the preamble transmitted on the RO in the resource pool includes: skipping numbering the invalid PO, wherein actual available PO indexes are consecutive; or consecutively numbering all configured POs, and skipping a number of the invalid PO, wherein actual available PO numbers are nonconsecutive.

According to a second aspect, the present disclosure provides an apparatus for configuring random access resource. The apparatus is located in a base station, and the apparatus includes: a first configuration unit, configured to configure a PO resource pool required for data transmission and associated with preambles transmitted on all ROs in each same time domain or all ROs in each same RACH slot in each RACH period, wherein the PO resource pool includes one or more data transmission resource POs; a mapping unit, configured to perform consecutive mapping between preambles on each RO and POs in the PO resource pool; and a second configuration unit, configured to: in response to remaining POs in the PO resource pool cannot map all preambles transmitted on the ROs, configure the remaining POs as invalid POs to which preambles are no longer mapped.

In an embodiment, the first configuration unit is configured to configure the PO resource pool in a unit of all the ROs in the same time domain, wherein a PO set associated with all the ROs in the same time domain is the PO resource pool, the PO in the PO resource pool is associated with the preamble transmitted on the RO, and a number of the PO resource pools is equal to a number of time domain ROs in the RACH period.

In an embodiment, the first configuration unit is configured to configure a time domain PO resource set, and indicate a number of repetitions of the time domain PO resource set in a frequency domain direction, wherein frequency domain POs are consecutive or nonconsecutive.

In an embodiment, the first configuration unit is configured to configure the PO resource pool in a unit of all the ROs within the same RACH slot, wherein the PO in the PO resource pool is associated with the preamble transmitted on the RO, and a number of the PO resource pools is equal to a number of RACH slots in the RACH period.

In an embodiment, the mapping unit is configured to map in one of the following manners based on a mapping relationship and a preamble index in a sequence of first all ROs in the same time domain and then all ROs in different time domains or first all ROs in a same frequency domain and then all ROs in different frequency domains: first mapping a PO at the first time domain PO position in the resource pool to a frequency domain end position of the resource pool in a frequency domain direction, and then performing mapping in the frequency domain direction at the second time domain PO position, until mapping between the preambles on all the ROs and the POs is completed; first mapping a PO at the first time domain PO position in the resource pool to a time domain end position of the resource pool in a time domain direction, and then performing mapping in the time domain direction at the second frequency domain PO position, until mapping between the preambles on all the ROs and the POs is completed; first mapping a PO at the first time domain PO position in the resource pool to a specified frequency domain position in a frequency domain direction, then mapping a PO associated with a preamble on the first RO at the second time domain PO position to the specified frequency domain position in the frequency domain direction, and then mapping a PO associated with a preamble on the second RO according to a same mapping principle in the frequency domain direction, until mapping between the preambles on all the ROs and the POs is completed; first mapping a PO at the first time domain PO position in the resource pool to a specified time domain position in a time domain direction, then mapping a PO associated with a preamble on the first RO at the second frequency domain PO position to the specified time domain position in the time domain direction, then mapping a PO associated with a preamble on the second RO according to a same mapping principle in the time domain direction, and then performing mapping in a frequency domain direction after completing mapping in the time domain direction, until mapping between the preambles on all the ROs and the POs is completed; or mapping POs associated with a same preamble on different ROs in the resource pool first in a time domain and then in a frequency domain or first in a frequency domain and then in a time domain, and sequentially performing mapping based on the preamble index, until mapping between the preambles on all the ROs and the POs is completed.

In an embodiment, the apparatus may further include: a first processing unit, configured to: in response to an indicated PO resource conflicting with an uplink resource configured by the base station as a downlink resource or another function, configure the corresponding PO as an invalid PO, and skip mapping between the invalid PO and the preamble transmitted on the RO in the resource pool; and a second processing unit, configured to perform rate matching or a puncture operation on data transmitted on the corresponding PO.

According to a third aspect, the present disclosure provides a base station. The base station includes the foregoing apparatus for configuring random access resource.

BRIEF DESCRIPTION OF DRAWINGS

FIG. 8 is a schematic diagram of a configuration of a PO resource pool associated with a RACH slot 4 according to Embodiment 1 of present disclosure;

FIG. 9 is a schematic diagram of a configuration of a PO resource pool associated with a RACH slot 9 according to Embodiment 1 of present disclosure;

FIG. 10 is a schematic diagram of ROs using a slot 4 as an example according to Embodiment 2 of present disclosure;

FIG. 15 and FIG. 16 each are a schematic diagram of a mapping relationship among ROs, preambles, and POs according to Embodiment 6 of the present disclosure.

DETAILED DESCRIPTION

To make the objectives, technical solutions, and advantages of the embodiments of the present disclosure clearer, the technical solutions in embodiments of the present disclosure will be described below clearly and completely with reference to the accompanying drawings in the embodiments of the present disclosure. Apparently, the described embodiments are merely some rather than all of the embodiments of the present disclosure. All other embodiments obtained by a person of ordinary skill in the art based on the examples of the present disclosure without creative efforts shall fall within the protection scope of the present disclosure.

Figure 1:
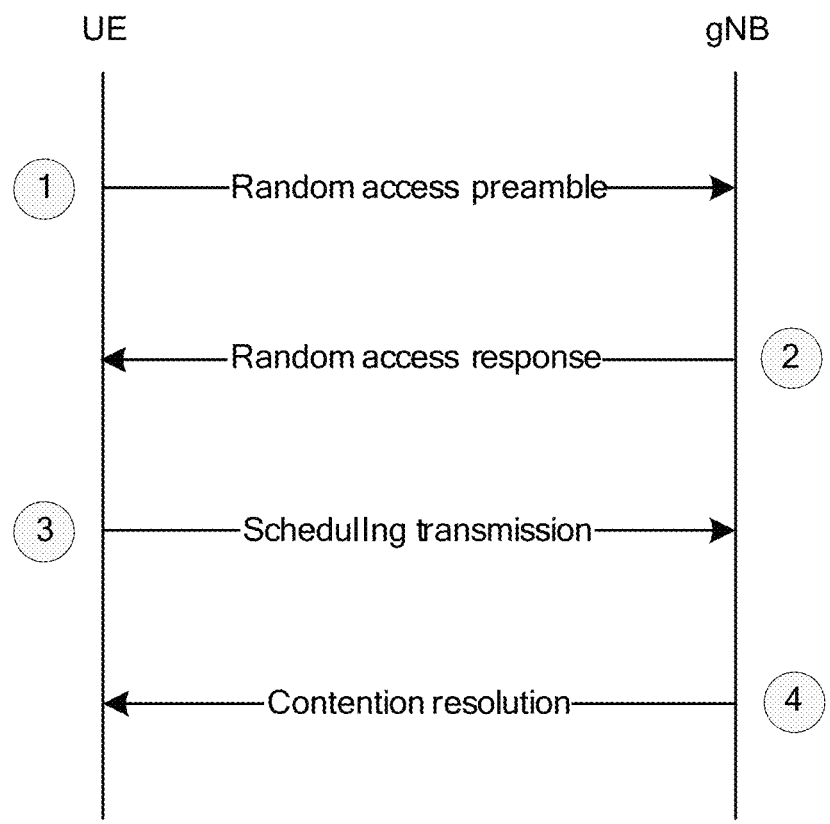
FIG. 1 is a schematic flowchart of a 4-step random access process.

As shown in FIG. 1, a 4-step random access process includes the following steps.

Step 1: Preamble transmission. A user equipment (UE) selects, based on a physical random access channel (PRACH) resource configured by a base station, a preamble (a maximum of 64 preambles can be configured) on a PRACH resource associated with a best downlink beam, to transmit a message (Msg) 1. The base station determines, based on the received preamble, a timing advance adjustment amount required by the UE for uplink transmission, and indicates the amount to the UE through a random access response message in the second step.

Step 2: Random access response reception. The UE determines, based on a time-frequency domain resource position at which the preamble is sent, a scrambling random access radio network temporary identity (RA-RNTI) for receiving a Msg 2, and indicates, by using a physical downlink control channel (PDCCH) scrambled by the RA-RNTI, a Msg 2 transmission resource corresponding to the preamble, where a temporary identity of the UE and a time-frequency domain resource position required by the UE to transmit a Msg 3 in the third step are further allocated to the Msg 2.

Step 3: The first time of uplink data scheduling transmission. The Msg 3 is transmitted based on the time-frequency resource position indicated by the Msg 2. The Msg 3 may be a common control channel service data unit (CCCH SDU) or a cell radio network temporary identity (C-RNTI) media access control control element (MAC CE), and includes a UE ID that may be a random number or an ID allocated by the base station to the UE.

Step 4: Contention resolution. The UE receives, based on the temporary identity (T C-RNTI) of the UE indicated in the Msg 2, a PDCCH scrambled by using the identity, to obtain a Msg 4 transmission resource position for receiving a Msg 4. The Msg 4 indicates, by using a MAC CE format, the first 48 bits of content transmitted through the Msg 3, where the first 48 bits of content includes the UE ID carried in the Msg 3.

In a process in which the UE performs the 4-step RACH, a plurality of UEs send a same preamble on a same time-frequency resource RACH occasion (RO), and the base station cannot identify which UE when receiving the preamble. Each UE can receive a Msg 2 random access response fed back by the base station, but cannot identify whether the base station sends the response to the UE. Therefore, the UEs send, on an uplink transmission resource indicated by the Msg 2, Msg 3 including their own UE IDs. Since the plurality of UEs send the Msg 3 on a same resource, the Msg 3 sent by the UEs will conflict and interfere with each other. The base station will eventually receive a Msg 3 sent by only one UE, and then sends a corresponding Msg 4 response message to the UE. All the UEs that send the Msg 3 can receive a Msg 4. Therefore, the contention resolution is needed. The UE distinguishes, based on the UE ID indicated by the Msg 4, whether the process in which the UE performs the RACH is successful.

Figure 2:
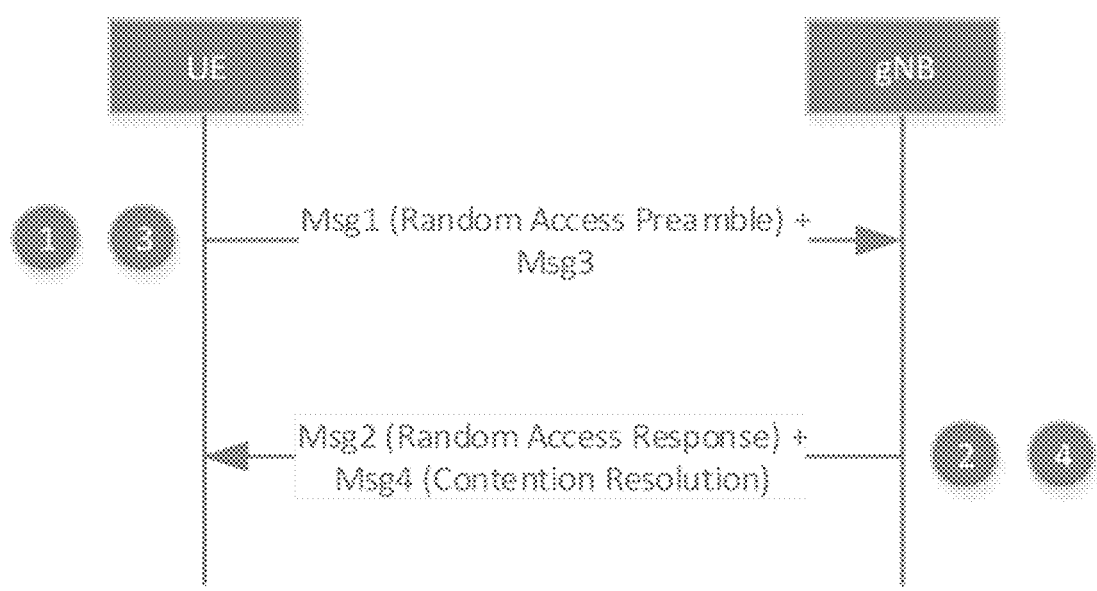
FIG. 2 is a schematic flowchart of a 2-step random access process.

The foregoing 4-step RACH requires 4 steps of interaction between the UE and the base station. A delay is too long for a terminal that is sensitive to a delay requirement. To reduce a delay of entire access, the original 4-step RACH is enhanced into a 2-step RACH. The Msg 1 and the Msg 3 in the original 4-step RACH are combined as a Msg A, and the Msg 2 and the Msg 4 are combined as a Msg B, as shown in FIG. 2. The Msg A includes at least content of the Msg 1/the Msg 3 in the 4-step RACH, and the Msg B includes at least content of the Msg 2/the Msg 4 in the 4-step RACH. For a data part of the Msg A, a data length is 72 bits in an inactive state, and a data length in another state is 56 bits.

Figure 3:
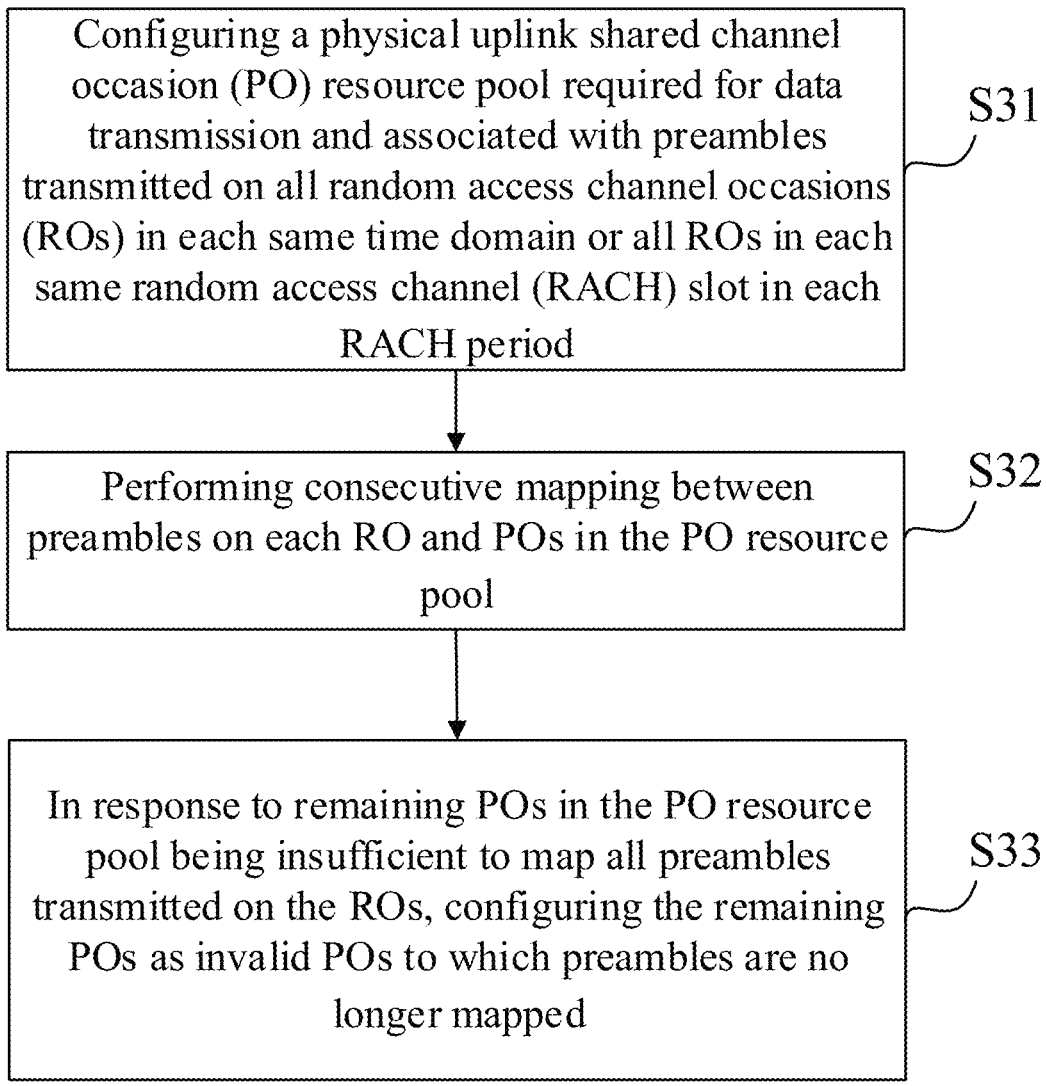
FIG. 3 is a flowchart of a method for configuring random access resource according to an embodiment of present disclosure.

An embodiment of the present disclosure provides a method for configuring random access resource. The method is applied to a base station. As shown in FIG. 3, the method includes the following steps.

S31: Configure a PO resource pool required for data transmission and associated with preambles transmitted on all ROs in each same time domain or all ROs in each same RACH slot in each RACH period. The PO resource pool includes one or more data transmission resource POs.

S32: Perform consecutive mapping between preambles on each RO and POs in the PO resource pool.

S33: In response to remaining POs in the PO resource pool cannot map all preambles transmitted on the ROs, configure the remaining POs as an invalid POs to which a preamble is no longer mapped.

According to the method for configuring random access resource provided in this embodiment of the present disclosure, the base station configures the PO resource pool required for data transmission and associated with the preambles transmitted on all the ROs in each same time domain or all the ROs in each same RACH slot in each RACH period, where the PO resource pool includes the one or more data transmission resource POs; performs consecutive mapping between the preambles on each RO and the POs in the PO resource pool; and in response to remaining POs in the PO resource pool cannot map all preambles transmitted on the ROs, configure the remaining POs as an invalid POs to which a preamble is no longer mapped, so that network signaling overheads can be reduced and resource utilization can be improved.

The method for configuring random access resource in the present disclosure is described in detail below.

The resource pool in this embodiment of the present disclosure indicates a set of POs used to transmit data, and each PO in the resource pool needs to be associated with one preamble.

The base station reserves some time domain PO resources for one or more groups of 2-step RACH ROs in the RACH period and consecutively maps one or more indicated frequency domain POs in a frequency domain, and consecutively maps contention preambles used for a 2-step RACH and transmitted on ROs in a group on the corresponding resources (that is, a scenario in which mapped POs are nonconsecutive during mapping cannot appear, unless after all mapping is completed). If there is a remaining PO that cannot be all mapped to preambles available to the 2-step RACH on the RO in the group, the corresponding PO is an invalid PO to which the preambles are no longer mapped.

Figure 4:
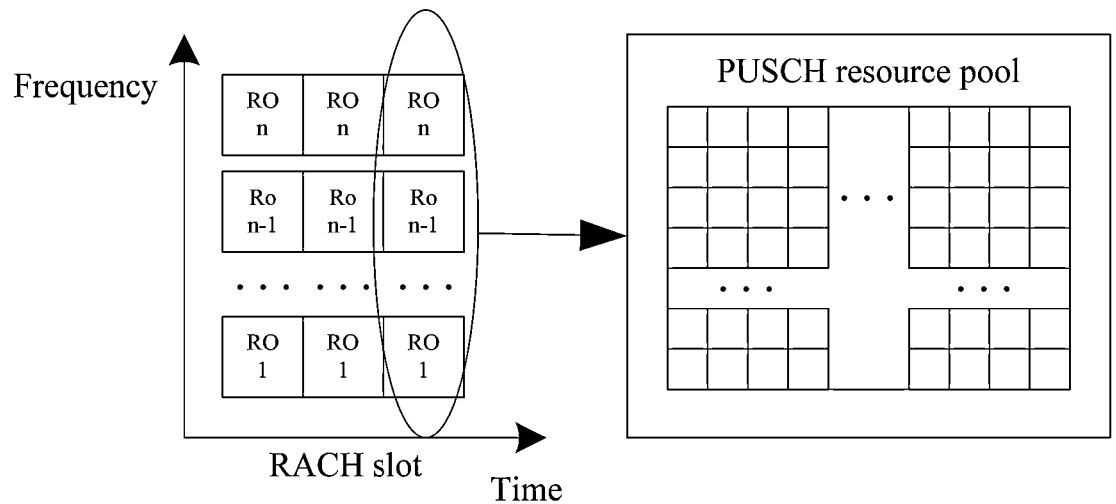
FIG. 4 is a schematic diagram of a PO set associated with all ROs in a same time domain as a resource pool according to an embodiment of present disclosure.

Solution 1: Reserve the PO resource pool in a unit of all the ROs in the same time domain, a PO set associated with all the ROs in the same time domain is defined as a resource pool, a PO in the resource pool needs to be associated with the preambles transmitted on the ROs, and the base station configures an equal number of resource pools based on a number of time domain ROs in the RACH period, as shown in FIG. 4.

Figure 5:
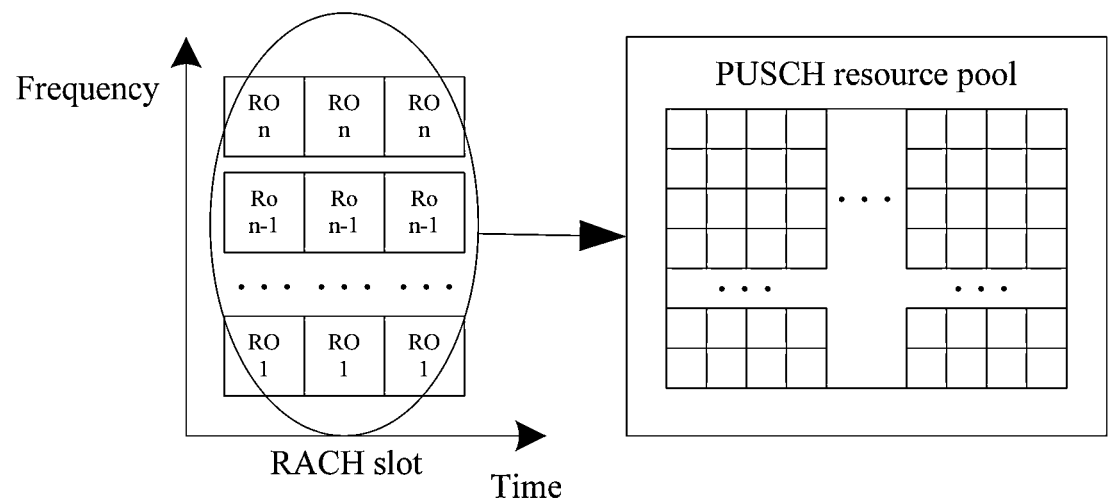
FIG. 5 is a schematic diagram of a PO set associated with all ROs within a same RACH slot as a resource pool according to an embodiment of present disclosure.

Solution 2: Reserve the PO resource pool in a unit of all the ROs within the same RACH slot, the PO in the resource pool needs to be associated with the preambles transmitted on the ROs, and the base station configures an equal number of resource pools based on a number of RACH slots in the RACH period, as shown in FIG. 5.

If an indicated PO resource conflicts with an uplink resource (such as a sounding reference signal (SRS), a configured grant, or an RO only used for a 4-step RACH) configured by the base station as a downlink resource or another function, there are two solutions as follows.

Solution 1: Based on that a corresponding PO is an invalid PO, skip the corresponding PO to map a preamble transmitted on an RO in the resource pool.

Embodiment 1: The PO is not numbered. That is, actual available PO indexes are consecutive.

Embodiment 2: Consecutively number all configured POs, and skip the numbers of the POs. That is, actual available PO numbers may be nonconsecutive.

Solution 2: Perform rate matching or a puncture operation on data transmitted on the corresponding PO.

Specific steps are as follows.

Step 1: Indicate positions of POs in a time domain by means of pre-configured resources.

Step 2: The base station instructs to consecutively map one or more frequency domain resources in the frequency domain to obtain positions of the POs in a frequency domain direction. A frequency division multiplexing (FDM) parameter may be configured. The resources may be consecutive or nonconsecutive. If the resources are nonconsecutive, a nonconsecutive frequency domain interval needs to be indicated.

Step 3: Determine configured POs as a resource pool for associating preambles.

Solution 1: Reserve the PO resource pool in a unit of a plurality of ROs in the same time domain, a PO set associated with all the ROs in the same time domain is defined as a resource pool, a PO in the resource pool needs to be associated with the preambles transmitted on the ROs, and the base station configures an equal number of resource pools based on a number of time domain ROs in the RACH period.

Solution 2: Reserve the PO resource pool in a unit of all the ROs within the same RACH slot, the PO in the resource pool needs to be associated with the preambles transmitted on the ROs, and the base station configures an equal number of resource pools based on a number of RACH slots in the RACH period.

Step 4: The PO resource sets appear repeatedly based on the RACH period.

Step 5: The base station indicates a mapping relationship between preambles and POs, such as one-to-one mapping (one-to-one mapping between preambles and data transmission time-frequency domain resources, that is, each preamble is mapped to one time-frequency domain resource), one-to-many mapping (each preamble is mapped to a plurality of time-frequency domain resources), or many-to-one mapping (a plurality of preambles are mapped to one time-frequency domain resource). In each resource pool, based on a mapping relationship and a preamble index in a sequence of first all the ROs in the same time domain and then all ROs in different time domains or first all ROs in a same frequency domain and then all ROs in different frequency domains.

Manner 1: First map a PO at the first time domain PO position in the resource pool to a frequency domain end position of the resource pool in a frequency domain direction, then perform mapping in the frequency domain direction at the second time domain PO position, and so on.

Manner 2: First map a PO at the first time domain PO position in the resource pool to a time domain end position of the resource pool in a time domain direction, then perform mapping in the time domain direction at the second frequency domain PO position, and so on.

Manner 3: First map a PO at the first time domain PO position in the resource pool to a specified frequency domain position in a frequency domain direction, then map a PO associated with a preamble on the first RO at the second time domain PO position to the specified frequency domain position in the frequency domain direction, then map a PO associated with a preamble on the second RO according to a same mapping principle in the frequency domain direction, and so on.

Manner 4: First map a PO at the first time domain PO position in the resource pool to a specified time domain position in a time domain direction, then map a PO associated with a preamble on the first RO at the second frequency domain PO position to the specified time domain position in the time domain direction, then map POs associated with preambles on the second RO according to a same mapping principle in the time domain direction, then perform mapping in a frequency domain direction after completing mapping in the time domain direction, and so on.

Manner 5: Map POs associated with a same preamble on different ROs in the resource pool first in a time domain and then in a frequency domain or first in a frequency domain and then in a time domain, and sequentially performing mapping based on the preamble index.

Step 6: After POs associated with preambles on all ROs in the resource pool are mapped, if there is a remaining PO to which not all preambles can be mapped, the PO is used as an invalid PO to which a preamble is no longer mapped.

Step 7: If the indicated PO resource conflicts with the uplink resource (such as the SRS, the configured grant, or the RO only used for the 4-step RACH) configured by the base station as the downlink resource or the another function, there are two solutions.

Solution 1: Based on that a corresponding PO is an invalid PO, skip the corresponding PO to map a preamble transmitted on an RO in the resource pool.

Embodiment 1: The PO is not numbered. That is, actual available PO indexes are consecutive.

Embodiment 2: Consecutively number all configured POs, and skip the numbers of the POs. That is, actual available PO numbers may be nonconsecutive.

Solution 2: Perform rate matching or a puncture operation on data transmitted on the corresponding PO.

If one preamble is mapped to a plurality of data transmission time-frequency domain resources, a UE randomly selects one of the plurality of data transmission time-frequency domain resources to which the selected preamble is mapped, to transmit data. If one or more preambles are mapped to one data transmission time-frequency domain resource, the UE transmits data on the data transmission time-frequency domain resource to which the selected preamble is mapped.

The method for configuring random access resource in the present disclosure is described in detail below with reference to specific embodiments.

Figures 6, 7:
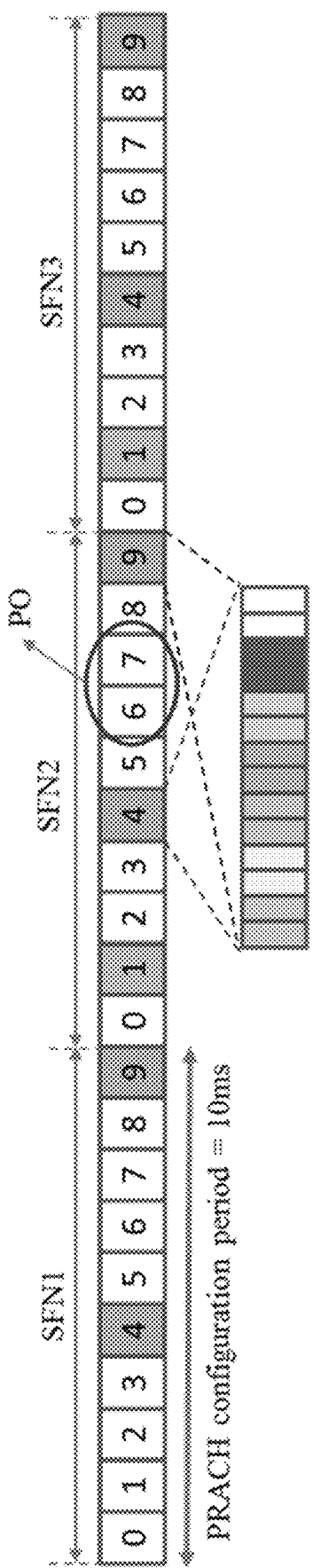
FIG. 6 is a schematic diagram of a configuration of a PRACH according to an embodiment of present disclosure.
FIG. 7 is a schematic diagram of RO numbers within a slot according to an embodiment of present disclosure.

As shown in FIG. 6, a PRACH configuration is as follows:

TDD: FormatA1: prach-ConfigurationIndex=81, Subcarrier spacing SCS=15 kHz; RACH period=10 ms, PRACH occasion offset=0; Subframe number: 4, 9, Start symbol index=0; PRACH slot number within a subframe=1; Number of time domain PRACH occasions within a RACH slot=6; PRACH duration=2.

According to the configuration shown in FIG. 6, it can be learned that:

The RACH period is 10 ms, the 15 kHz SCS, the RACH slots is an RACH subframe, there are two RACH slots in the period, there are six consecutive ROs within each RACH slot, and each RO time domain length is two symbols.

If an RO configuration parameter value in the frequency domain direction is 2, a number of ROs within each RACH slot is 2*6=12. There are two RACH slots in total in one RACH period. RO numbers within the slot are shown in FIG. 7.

Embodiment 1

The base station pre-configures the resource pool as follows.

As shown in FIG. 8, a configuration of a PO resource pool associated with each radio frame RACH slot 4:

It may be configured that there are four consecutive slots in total in subframes 5, 6, 7, and 8 of each radio frame, each PO occupies two symbols, and there are five consecutive POs within each slot. In this case, there are 4*5=20 POs in total in the time domain direction.

A new parameter X is introduced. That X=4 is configured to indicate a number of repetitions of the configured grant resources in the frequency domain direction. If resources are consecutive in the frequency domain direction, a frequency domain interval does not need to be configured.

According to the configurations, it can be learned that a size of a PO resource pool associated with each RACH slot 4 is 20*4=80 POs.

An RACH slot 9 is the last slot of each radio frame. A next radio frame may start from a downlink subframe. To reduce a delay of the 2-step RACH, the PO resource pool should not be too far away from the RO. Therefore, as shown in FIG. 9, the PO resource pool associated with the RACH slot 9 may be configured as: a subframe 9 of each radio frame, a start symbol 3, duration is two symbols, five consecutive POs, and frequency domain repetitions y=16.

Embodiment 2

Mapping relationship between preambles and POs.

The base station configures the mapping relationship as four-to-one: that is, four preambles are associated with one PO.

In the resource pool, a PO is mapped to a preamble on the first RO, then a PO is mapped to preambles on ROs in the same time domain and different frequency domains, and then a PO is mapped to preambles on ROs in different time domains.

A number of contention preambles is configured as 24.

A number of POs that need to be associated with a preamble on an RO is 24/4=6.

A mapping relationship between preambles on ROs in an RACH slot and POs uses a slot 4 as an example.

FIG. 10 is a schematic diagram of ROs.

Figure 11:
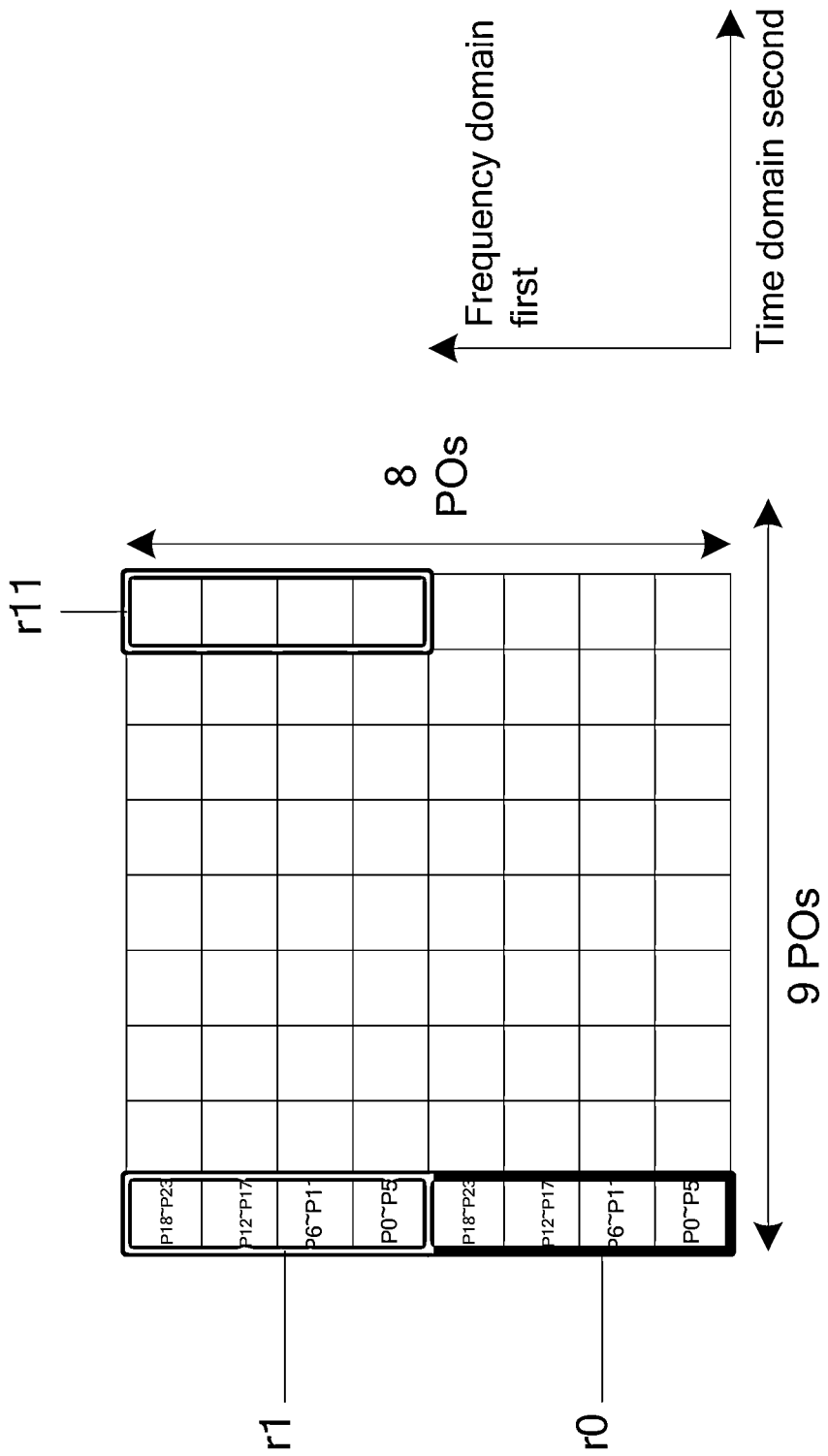
FIG. 11 is a schematic diagram of a mapping relationship among ROs, preambles, and POs in a resource pool using a slot 4 as an example according to Embodiment 2 of the present disclosure.

FIG. 11 shows a mapping relationship among ROs, preambles, and POs in the resource pool, namely, first frequency domain and then time domain mapping.

Embodiment 3

Figure 12:
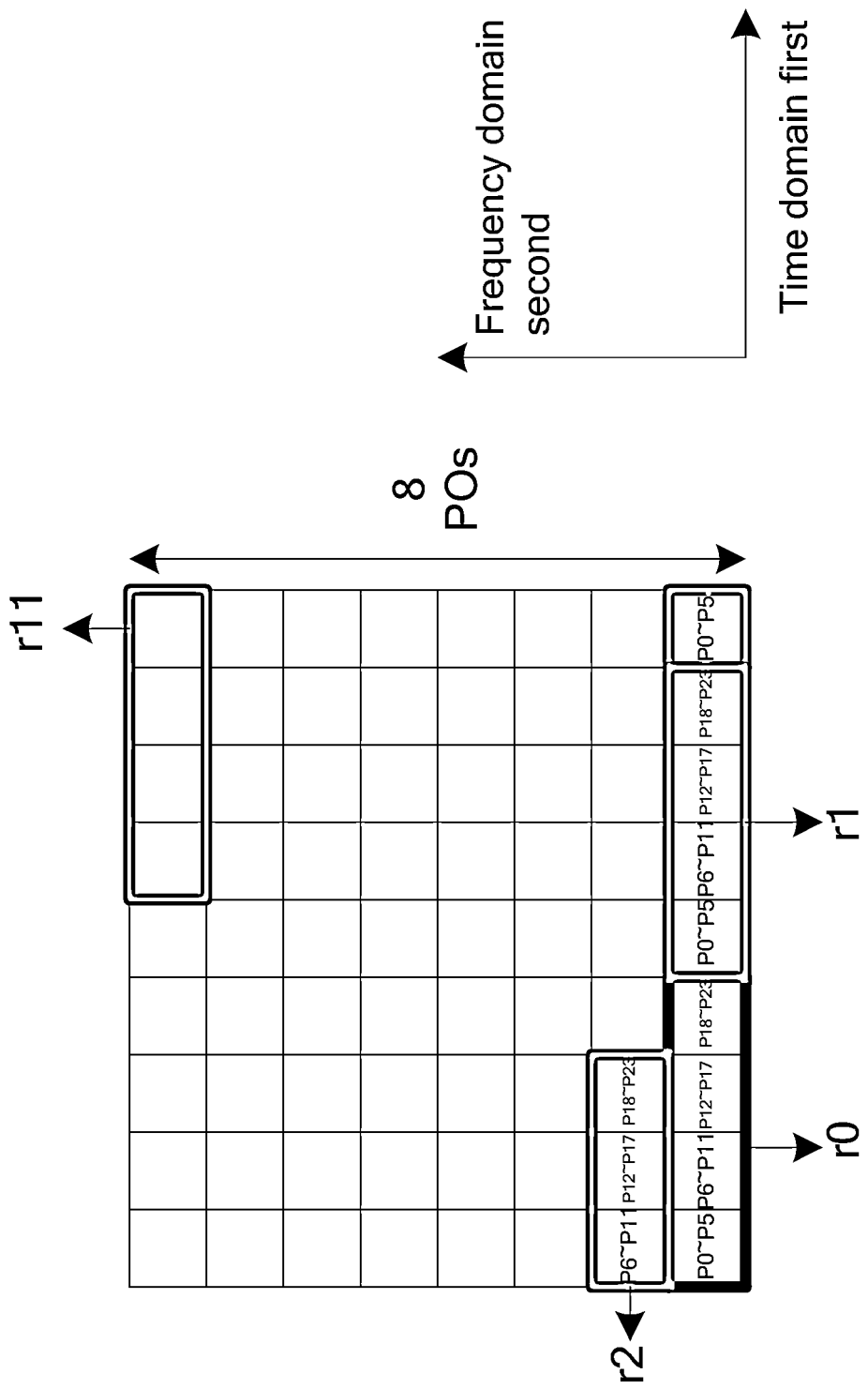
FIG. 12 is a schematic diagram of a mapping relationship among ROs, preambles, and POs in a resource pool using a slot 4 as an example according to Embodiment 3 of the present disclosure.

In this embodiment, a mapping relationship, namely, first time domain and then frequency domain mapping, among ROs, preambles, and POs in the resource pool as shown in FIG. 12 is used.

Embodiment 4

Figure 13:
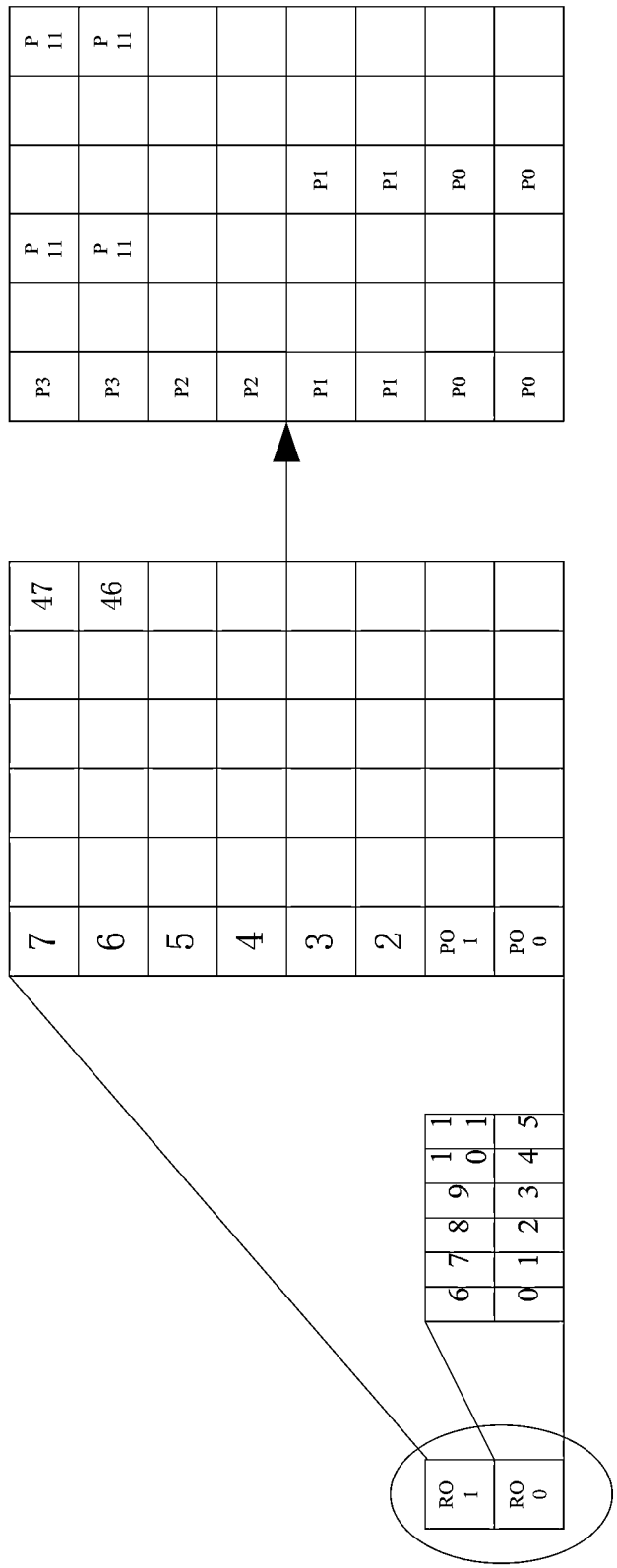
FIG. 13 is a schematic diagram of a mapping relationship among ROs, preambles, and POs in a resource pool according to Embodiment 4 of the present disclosure.

As shown in FIG. 13, preambles on a same RO are mapped first, and preambles on different ROs are mapped based on RO indexes.

For example, the PO resource set is configured based on a RO set in a same time domain. For example, there are two ROs in total in the frequency domain, a number of preambles used for the two-step RACH on each RO is 12, the preambles are numbered from 0 to 11, and each preamble is associated with two POs. The PO resource pool is configured with a total of 72 POs numbered from 0 to 71 in a form of columns in sequence. Then PO positions associated with preambles on each RO are as follows.

A preamble 0 on an RO 0 is mapped to a PO 0 and a PO 1.
A preamble 1 on the RO 0 is mapped to a PO 2 and a PO 3.
. . .
A preamble 11 on the RO 0 is mapped to a PO 20 and a PO 21.
A preamble 0 on an RO 1 is mapped to a PO 22 and a PO 23.
A preamble 1 on the RO 1 is mapped to a PO 24 and a PO 25.
. . .
A preamble 11 on the RO 1 is mapped to a PO 46 and a PO 47.

Embodiment 5

Figure 14:
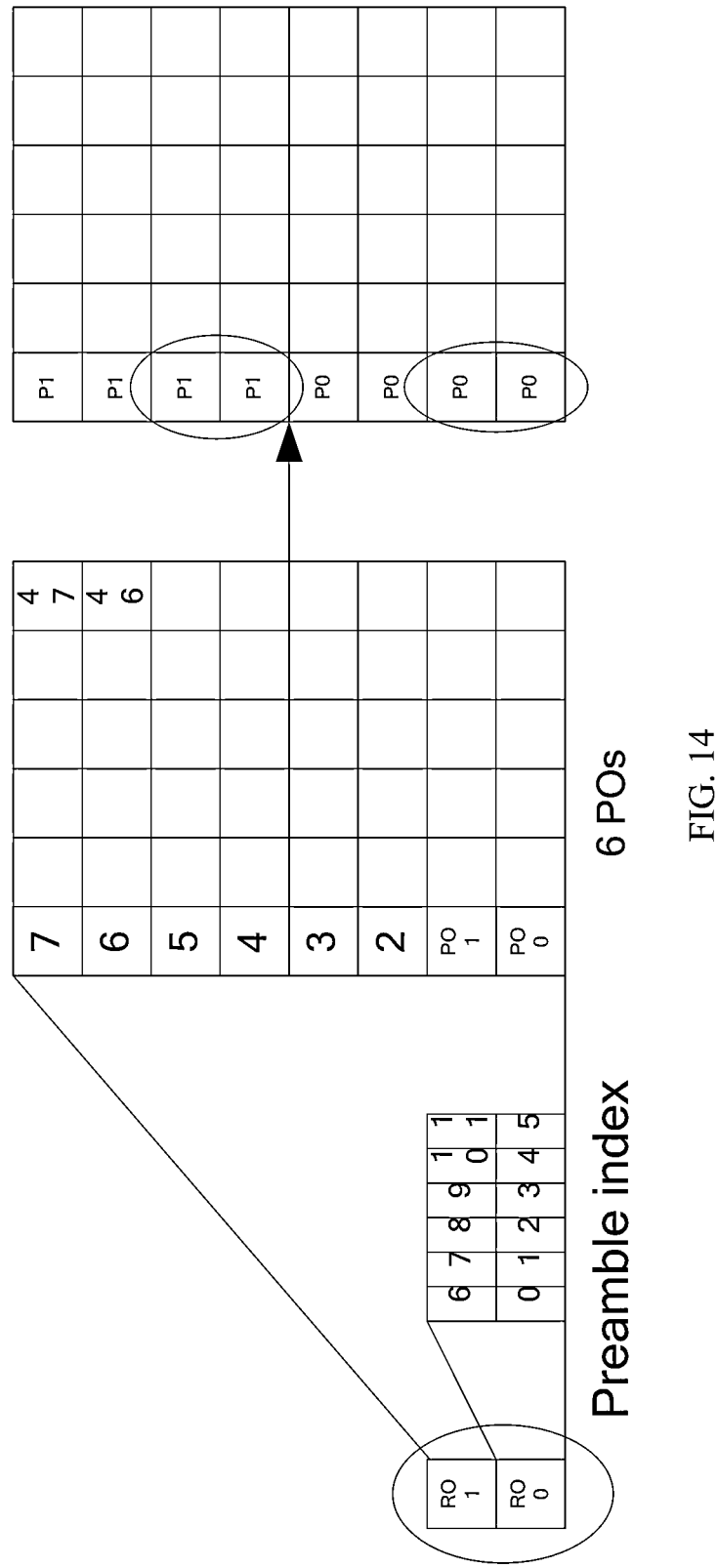
FIG. 14 is a schematic diagram of a mapping relationship among ROs, preambles, and POs in a resource pool according to Embodiment 5 of the present disclosure.

As shown in FIG. 14, same preambles on different ROs are mapped first sequentially based on preamble indexes.

For example, the PO resource set is configured based on a RO set in a same time domain. For example, there are two ROs in total in the frequency domain, a number of preambles used for the two-step RACH on each RO is 12, the preambles are numbered from 0 to 11, and each preamble is associated with two POs. The PO resource pool is configured with a total of 72 POs numbered from 0 to 71 in a form of columns in sequence. Then PO positions associated with preambles on each RO are as follows.

A preamble 0 on an RO 0 is mapped to a PO 0 and a PO 1.
A preamble 0 on an RO 1 is mapped to a PO 2 and a PO 3.
A preamble 1 on the RO 0 is mapped to a PO 4 and a PO 5.
A preamble 1 on the RO 1 is mapped to a PO 6 and a PO 7.
. . .
A preamble 11 on the RO 0 is mapped to a PO 44 and a PO 45.
A preamble 11 on the RO 1 is mapped to a PO 46 and a PO 47.

Embodiment 6

If indicated PO resources conflict with an uplink resource configured by the base station as another function (such as an SRS, a configured grant, or an RO only used for a 4-step RACH), a corresponding PO is an invalid PO, and the corresponding PO is skipped to map a preamble transmitted on the RO in the group.

Figure 15:
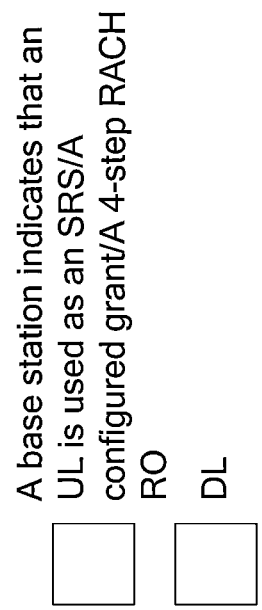

As shown in FIG. 15, the PO is not numbered. That is, actual available PO indexes are consecutive.

The actual valid PO indexes are a PO 0, a PO 1, a PO 2, a PO 3, a PO 4, a PO 5, and the like.

As shown in FIG. 16, all configured POs are consecutively numbered. The PO numbers are skipped. That is, actual available PO numbers may be nonconsecutive).

The actual valid PO indexes are a PO 0, a PO 1, a PO 2, a PO 3, a PO 5, a PO 6, and the like.

Figure 17:
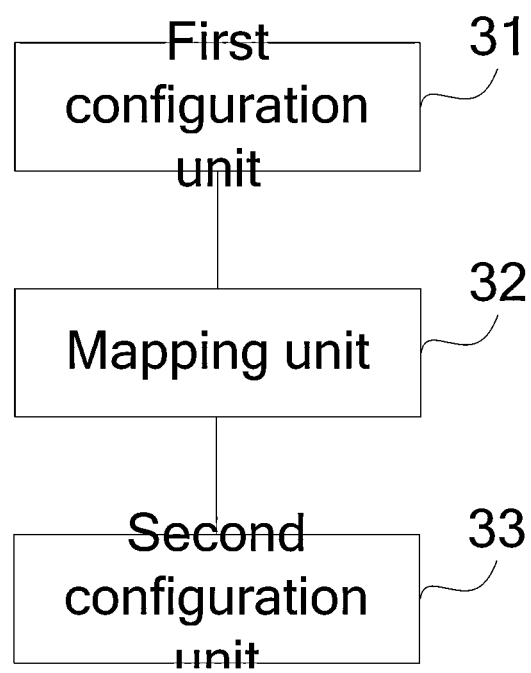
FIG. 17 is a schematic structural diagram of an apparatus for configuring random access resource according to an embodiment of the present disclosure.

An embodiment of the present disclosure further provides an apparatus for configuring random access resource. The apparatus is located in a base station. As shown in FIG. 17, the apparatus includes:

a first configuration unit 31, used to configure a PO resource pool required for data transmission and associated with preambles transmitted on all ROs in each same time domain or all ROs in each same RACH slot in each RACH period, where the PO resource pool includes one or more data transmission resource POs;

a mapping unit 32, configured to perform consecutive mapping between preambles on each RO and POs in the PO resource pool; and a second configuration unit 33, configured to: if there is a remaining PO that is in the PO resource pool and to which not all preambles transmitted on the ROs are able to be mapped any more, configure the remaining PO as an invalid PO to which a preamble is no longer mapped.

For the apparatus for configuring random access resource provided in this embodiment of the present disclosure, the base station configures the PO resource pool required for data transmission and associated with the preambles transmitted on all the ROs in each same time domain or all the ROs in each same RACH slot in each RACH period, where the PO resource pool includes the one or more data transmission resource POs; performs consecutive mapping between the preambles on each RO and the POs in the PO resource pool; and in response to remaining POs in the PO resource pool cannot map all preambles transmitted on the ROs, configure the remaining POs as an invalid POs to which a preamble is no longer mapped, so that network signaling overheads can be reduced and resource utilization can be improved.

In an embodiment, the first configuration unit 31 may be used to configure the PO resource pool in a unit of all the ROs in the same time domain, where a PO set associated with all the ROs in the same time domain is the PO resource pool, the PO in the PO resource pool is associated with the preamble transmitted on the RO, and a number of the PO resource pools is equal to a number of time domain ROs in the RACH period. In an embodiment, the first configuration unit 31 may be used to configure the PO resource pool in a unit of all the ROs within the same RACH slot, where the PO in the PO resource pool is associated with the preamble transmitted on the RO, and a number of the PO resource pools is equal to a number of RACH slots in the RACH period.

In an embodiment, the first configuration unit 31 may be used to configure a time domain PO resource set, and indicate a number of repetitions of the time domain PO resource set in a frequency domain direction, where frequency domain POs are consecutive or nonconsecutive.

In an embodiment, the mapping unit 32 may be configured to map in one of the following multiple manners based on a mapping relationship and a preamble index in a sequence of first all ROs in the same time domain and then all ROs in different time domains or first all ROs in a same frequency domain and then all ROs in different frequency domains.

First mapping a PO at the first time domain PO position in the resource pool to a frequency domain end position of the resource pool in a frequency domain direction, and then performing mapping in the frequency domain direction at the second time domain PO position, until mapping between the preambles on all the ROs and the POs is completed.

First mapping a PO at the first time domain PO position in the resource pool to a time domain end position of the resource pool in a time domain direction, and then performing mapping in the time domain direction at the second frequency domain PO position, until mapping between the preambles on all the ROs and the POs is completed.

First mapping a PO at the first time domain PO position in the resource pool to a specified frequency domain position in a frequency domain direction, then mapping a PO associated with a preamble on the first RO at the second time domain PO position to the specified frequency domain position in the frequency domain direction, and then mapping a PO associated with a preamble on the second RO according to a same mapping principle in the frequency domain direction, until mapping between the preambles on all the ROs and the POs is completed.

First mapping a PO at the first time domain PO position in the resource pool to a specified time domain position in a time domain direction, then mapping a PO associated with a preamble on the first RO at the second frequency domain PO position to the specified time domain position in the time domain direction, then mapping a PO associated with a preamble on the second RO according to a same mapping principle in the time domain direction, and then performing mapping in a frequency domain direction after completing mapping in the time domain direction, until mapping between the preambles on all the ROs and the POs is completed.

Mapping POs associated with a same preamble on different ROs in the resource pool first in a time domain and then in a frequency domain or first in a frequency domain and then in a time domain, and sequentially performing mapping based on the preamble index, until mapping between the preambles on all the ROs and the POs is completed.

In an embodiment, the apparatus may further include:
a first processing unit, configured to: in response to an indicated PO resource conflicting with an uplink resource configured by the base station as a downlink resource or another function, configure the corresponding PO as an invalid PO, and skip mapping between the invalid PO and the preamble transmitted on the RO in the resource pool; and a second processing unit, configured to perform rate matching or a puncture operation on data transmitted on the corresponding PO.

In an embodiment, the first processing unit may be configured to skip numbering the invalid PO, where actual available PO indexes are consecutive; or consecutively number all configured POs, and skip a number of the invalid PO, where actual available PO numbers are nonconsecutive.

The apparatus in this embodiment can be used to execute the technical solution in the foregoing method embodiment, and an implementation principle and a technical effect thereof are similar, and are not described herein again.

An embodiment of the present disclosure further provides a base station. The base station includes the foregoing apparatus for configuring random access resource.

A person of ordinary skill in the art can understand that all or some of processes for implementing the foregoing method embodiments can be completed by a computer program instructing relevant hardware. The program may be stored in a computer-readable storage medium. When the program is executed, the processes of the foregoing method embodiments may be performed. The storage medium may be a magnetic disk, an optical disc, a read-only memory (ROM), a random access memory (RAM), or the like.

The foregoing descriptions are merely specific implementations of the present disclosure, and the protection scope of the present disclosure is not limited thereto. Any modification or replacement easily conceived by those skilled in the art within the technical scope of the present disclosure should fall within the protection scope of the present disclosure. Therefore, the protection scope of the present disclosure should be subject to the protection scope of the claims.

What is claimed is:

1. A method for configuring random access resource, applied to a base station, comprising:
   configuring a physical uplink shared channel occasion (PO) resource pool required for data transmission and associated with preambles transmitted on all random access channel occasions (ROs) in each same time domain or all ROs in each same random access channel (RACH) slot in each RACH period, wherein the PO resource pool comprises one or more data transmission resource POs;
   performing consecutive mapping between preambles on each RO and POs in the PO resource pool; and
   in response to remaining POs in the PO resource pool being insufficient to map all preambles transmitted on the ROs, configuring the remaining POs as invalid POs to which preambles are no longer mapped.

2. The method according to claim 1, wherein said configuring a PO resource pool required for data transmission and associated with preambles transmitted on all ROs in each same time domain or all ROs in each same RACH slot in each RACH period comprises: configuring the PO resource pool in a unit of all the ROs in the same time domain, wherein a PO set associated with all the ROs in the same time domain is the PO resource pool, the PO in the PO resource pool is associated with the preamble transmitted on the RO, and a number of the PO resource pools is equal to a number of time domain ROs in the RACH period.

3. The method according to claim 1, wherein said configuring a PO resource pool required for data transmission and associated with preambles transmitted on all ROs in each same time domain or all ROs in each same RACH slot in each RACH period comprises: configuring the PO resource pool in a unit of all the ROs within the same RACH slot, wherein the PO in the PO resource pool is associated with the preamble transmitted on the RO, and a number of the PO resource pools is equal to a number of RACH slots in the RACH period.

4. The method according to claim 1, wherein said configuring a PO resource pool required for data transmission and associated with preambles transmitted on all ROs in each same time domain or all ROs in each same RACH slot in each RACH period comprises: configuring a time domain PO resource set, and indicating a number of repetitions of the time domain PO resource set in a frequency domain direction, wherein frequency domain POs are consecutive or nonconsecutive.

5. The method according to claim 1, wherein said performing consecutive mapping between preambles on each RO and POs in the PO resource pool comprises: performing mapping in one of the following manners based on a mapping relationship and a preamble index in a sequence of first all ROs in the same time domain and then all ROs in different time domains or first all ROs in a same frequency domain and then all ROs in different frequency domains.

6. The method according to claim 5, wherein said mapping comprises at least one of the following manners:
   first mapping a PO at the first time domain PO position in the resource pool to a frequency domain end position of the resource pool in a frequency domain direction, and then performing mapping in the frequency domain direction at the second time domain PO position, until mapping between the preambles on all the ROs and the POs is completed;
   first mapping a PO at the first time domain PO position in the resource pool to a time domain end position of the resource pool in a time domain direction, and then performing mapping in the time domain direction at the second frequency domain PO position, until mapping between the preambles on all the ROs and the POs is completed;
   first mapping a PO at the first time domain PO position in the resource pool to a specified frequency domain position in a frequency domain direction, then mapping a PO associated with a preamble on the first RO at the second time domain PO position to the specified frequency domain position in the frequency domain direction, and then mapping a PO associated with a preamble on the second RO according to a same mapping principle in the frequency domain direction, until mapping between the preambles on all the ROs and the POs is completed;
   first mapping a PO at the first time domain PO position in the resource pool to a specified time domain position in a time domain direction, then mapping a PO associated with a preamble on the first RO at the second frequency domain PO position to the specified time domain position in the time domain direction, then mapping a PO associated with a preamble on the second RO according to a same mapping principle in the time domain direction, and then performing mapping in a frequency domain direction after completing mapping in the time domain direction, until mapping between the preambles on all the ROs and the POs is completed; or
   mapping POs associated with a same preamble on different ROs in the resource pool first in a time domain and then in a frequency domain or first in a frequency domain and then in a time domain, and sequentially performing mapping based on the preamble index, until mapping between the preambles on all the ROs and the POs is completed.

7. The method according to claim 6, further comprising:
   in response to an indicated PO resource conflicting with an uplink resource configured by the base station as a downlink resource or another function, configuring the corresponding PO as an invalid PO, and skipping mapping between the invalid PO and the preamble transmitted on the RO in the resource pool; or performing rate matching or a puncture operation on data transmitted on the corresponding PO.

8. The method according to claim 7, wherein said configuring the corresponding PO as an invalid PO, and skipping mapping between the invalid PO and the preamble transmitted on the RO in the resource pool comprises:
   skipping numbering the invalid PO, wherein actual available PO indexes are consecutive; or
   consecutively numbering all configured POs, and skipping a number of the invalid PO, wherein actual available PO numbers are nonconsecutive.

9. An apparatus for configuring random access resource, located in a base station, comprising at least one processor; and
   a memory configured to store instructions executable by the at least one processor;
   wherein the instructions cause the at least one processor to:
   configure a PO resource pool required for data transmission and associated with preambles transmitted on all ROs in each same time domain or all ROs in each same RACH slot in each RACH period, wherein the PO resource pool comprises one or more data transmission resource POs;
   perform consecutive mapping between preambles on each RO and POs in the PO resource pool; and
   in response to remaining POs in the PO resource pool being insufficient to map all preambles transmitted on the ROs, configure the remaining POs as invalid POs to which preambles are no longer mapped.

10. The apparatus according to claim 9, wherein at least one processor is further configured to configure the PO resource pool in a unit of all the ROs in the same time domain, wherein a PO set associated with all the ROs in the same time domain is the PO resource pool, the PO in the PO resource pool is associated with the preamble transmitted on the RO, and a number of the PO resource pools is equal to a number of time domain ROs in the RACH period.

11. The apparatus according to claim 10, wherein the at least one processor is further configured to configure the PO resource pool in a unit of all the ROs within the same RACH slot, wherein the PO in the PO resource pool is associated with the preamble transmitted on the RO, and a number of the PO resource pools is equal to a number of RACH slots in the RACH period.

12. The apparatus according to claim 9, wherein the at least one processor is further configured to configure a time domain PO resource set, and indicate a number of repetitions of the time domain PO resource set in a frequency domain direction, wherein frequency domain POs are consecutive or nonconsecutive.

13. The apparatus according to claim 9, wherein the at least one processor is further configured to map in one of the following manners based on a mapping relationship and a preamble index in a sequence of first all ROs in the same time domain and then all ROs in different time domains or first all ROs in a same frequency domain and then all ROs in different frequency domains.

14. The apparatus according to claim 13, wherein said mapping comprises at least one of the following manners:
   first mapping a PO at the first time domain PO position in the resource pool to a frequency domain end position of the resource pool in a frequency domain direction, and then performing mapping in the frequency domain direction at the second time domain PO position, until mapping between the preambles on all the ROs and the POs is completed;

first mapping a PO at the first time domain PO position in the resource pool to a time domain end position of the resource pool in a time domain direction, and then performing mapping in the time domain direction at the second frequency domain PO position, until mapping between the preambles on all the ROs and the POs is completed;

first mapping a PO at the first time domain PO position in the resource pool to a specified frequency domain position in a frequency domain direction, then mapping a PO associated with a preamble on the first RO at the second time domain PO position to the specified frequency domain position in the frequency domain direction, and then mapping a PO associated with a preamble on the second RO according to a same mapping principle in the frequency domain direction, until mapping between the preambles on all the ROs and the POs is completed;

first mapping a PO at the first time domain PO position in the resource pool to a specified time domain position in a time domain direction, then mapping a PO associated with a preamble on the first RO at the second frequency domain PO position to the specified time domain position in the time domain direction, then mapping a PO associated with a preamble on the second RO according to a same mapping principle in the time domain direction, and then performing mapping in a frequency domain direction after completing mapping in the time domain direction, until mapping between the preambles on all the ROs and the POs is completed; or mapping POs associated with a same preamble on different ROs in the resource pool first in a time domain and then in a frequency domain or first in a frequency domain and then in a time domain, and sequentially performing mapping based on the preamble index, until mapping between the preambles on all the ROs and the POs is completed.

15. The apparatus according to claim 14, wherein the at least one processor is further configured to:
  in response to an indicated PO resource conflicting with an uplink resource configured by the base station as a downlink resource or another function, configure the corresponding PO as an invalid PO, and skip mapping between the invalid PO and the preamble transmitted on the RO in the resource pool; and
  perform rate matching or a puncture operation on data transmitted on the corresponding PO.

16. The apparatus according to claim 15, wherein the at least one processor is further configured to skip numbering the invalid PO, wherein actual available PO indexes are consecutive; or consecutively number all configured POs, and skip a number of the invalid PO, wherein actual available PO numbers are nonconsecutive.

17. A non-transitory computer-readable storage medium, wherein the computer-readable storage medium stores computer program instructions thereon, the computer program instructions, when being executed by at least one processor, are configured to:
  configure a PO resource pool required for data transmission and associated with preambles transmitted on all ROs in each same time domain or all ROs in each same RACH slot in each RACH period, wherein the PO resource pool comprises one or more data transmission resource POs;
  perform consecutive mapping between preambles on each RO and POs in the PO resource pool; and
  in response to remaining POs in the PO resource pool being insufficient to map all preambles transmitted on the ROs, configure the remaining POs as invalid POs to which preambles are no longer mapped.

18. The non-transitory computer-readable storage medium according to claim 17, wherein the at least one processor is further configured to configure the PO resource pool in a unit of all the ROs in the same time domain, wherein a PO set associated with all the ROs in the same time domain is the PO resource pool, the PO in the PO resource pool is associated with the preamble transmitted on the RO, and a number of the PO resource pools is equal to a number of time domain ROs in the RACH period.

19. The non-transitory computer-readable storage medium according to claim 17, wherein the at least one processor is further configured to configure the PO resource pool in a unit of all the ROs within the same RACH slot, wherein the PO in the PO resource pool is associated with the preamble transmitted on the RO, and a number of the PO resource pools is equal to a number of RACH slots in the RACH period.

20. The non-transitory computer-readable storage medium according to claim 17, wherein the at least one processor is further configured to configure a time domain PO resource set, and indicate a number of repetitions of the time domain PO resource set in a frequency domain direction, wherein frequency domain POs are consecutive or nonconsecutive.

* * * * *